United States Patent
Obara et al.

Patent Number: 5,091,623
Date of Patent: Feb. 25, 1992

[54] WELDING GUN PROVIDED WITH A BACKUP CYLINDER

[75] Inventors: Hiroshi Obara; Toshihiro Nishiwaki, both of Tokyo, Japan

[73] Assignee: Obara Corporation, Tokyo, Japan

[21] Appl. No.: 544,734

[22] Filed: Jun. 27, 1990

[51] Int. Cl.⁵ ............................................. B23K 9/28
[52] U.S. Cl. .................................. 219/89; 219/86.25
[58] Field of Search ....................... 219/89, 90, 86.25

[56] References Cited

U.S. PATENT DOCUMENTS 3,978,308  8/1976  Hamby ................................. 219/89
4,810,849  3/1989  Heideman ........................... 219/89

FOREIGN PATENT DOCUMENTS 59-34724  9/1984  Japan.

*Primary Examiner*—Marvin M. Lateef
*Attorney, Agent, or Firm*—Flynn, Thiel, Boutell & Tanis

[57] ABSTRACT

A welding gun provided with a backup cylinder is characterized in that the welding gun is moved toward a workpiece by a welding robot an end of which is connected to the welding gun via a bracket, then one electrode is brought into contact with the workpiece by a backup cylinder so that the workpiece is held by one electrode, thereafter the other electrode is brought into contact with the workpiece by a pressure application cylinder so that the pressure force is applied to the workpiece by both the electrodes for welding operation.

3 Claims, 2 Drawing Sheets

WELDING GUN PROVIDED WITH A BACKUP CYLINDER

BACKGROUND OF THE INVENTION

The present invention relates to a welding gun attached to an arm of a welding robot and provided with a backup cylinder.

It is conventional that an equalizing device is provided between a robot arm and a welding gun.

As illustrated in FIG. 4, an equalizing device 63 is placed between a robot arm 61 and a welding gun 62. The welding gun 62 comprises a fixed arm 65 having an electrode 64 at the tip end thereof, a movable arm 67 having an electrode 66 at the tip end thereof and a cylinder 68 fixed to the fixed arm 65 for moving the movable arm 67 toward or away from the electrode 64. With such an arrangement, a workpiece 69 is positioned between the fixed arm 65 and the movable arm 67 so that the electrodes 64, 66 are movable toward the workpiece 69 by movement of the welding gun 62 by the robot arm 61, thereafter the cylinder 68 is actuated so that the electrode 66 provided at the tip end of the movable arm 67 is brought into contact with the workpiece 69. At this state, the movable arm 67 is liable to further move forward, but the forward movement thereof acts against the fixed arm 65 as the reaction force since the electrode 66 is brought into contact with the workpiece 69. Hence the fixed arm 65 is moved by the equalizing device 63 so that the electrode 64 is brought into contact with the opposite surface of the workpiece 69. When both of the electrodes 66, 64 are brought into contact with the workpiece 69, the pressure force is further applied to the workpiece 69 and the current is applied to the workpiece 69 so that the workpiece 69 is welded.

The prior art welding gun has, however, a drawback that distortion is apt to occur at one surface of the workpiece 69 caused by the electrode 64 since the inertia becomes large if the fixed arm 65 is large at the time when the fixed arm 65 is moved by the reaction force set forth above. This provides an obstacle to a successful welding operation.

SUMMARY OF THE INVENTION

The present invention has been made to solve the problem of the prior art welding gun.

It is therefore an object of the present invention to provide a welding gun provided with a backup cylinder capable of eliminating the equalizing device and provided with a backup cylinder so that a safe, accurate welding operation can be achieved, even if employed in a large robot arm, with low cost of equipment.

To achieve the above object, the welding gun provided with a backup cylinder according to a preferred embodiment of the present invention comprises a fixed arm fixed to a tip end of a robot arm through a bracket, a backup cylinder fixed to the tip end of the fixed arm and provided with a cylinder rod having an electrode at the tip end thereof and a main cylinder fixed to the fixed arm opposite to the backup cylinder for moving a movable arm having an electrode at the tip end thereof.

The above and other objects, features and advantages of the present invention will become more apparent from the following description taken in conjunction with the accompanying drawings.

DESCRIPTION OF THE PREFERRED EMBODIMENT

Figure 1:
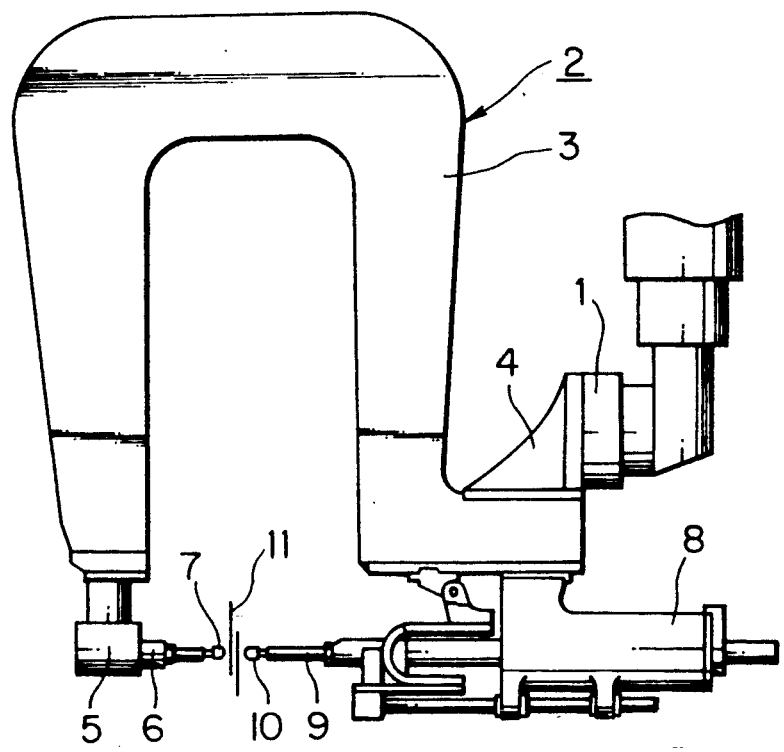
FIG. 1 is a side elevational view of a C-type welding gun provided with a backup cylinder according to a first embodiment of the present invention.

First Embodiment (FIG. 1)

A C-type welding gun provided with a backup cylinder according to a first embodiment of the present invention will be described with reference to FIG. 1.

A fixed arm 3 constituting a welding gun 2 provided with a backup cylinder is fixed to a tip end of a robot arm 1 via a bracket 4. The fixed arm 3 has a backup cylinder 5 at the tip end thereof. The backup cylinder 5 has a rod 6 provided with an electrode 7 at the tip end thereof. The fixed arm 3 has a main cylinder 8 fixed thereto which cylinder 8 is connected to a movable arm 9 provided with an electrode 10 at the tip end thereof.

The C-type welding gun provided with a backup cylinder and having such an arrangement operates as follows.

The electrode 7 at the side of the fixed arm 3 and the electrode 10 at the side of the movable arm 9 are moved to positions adjacent to a workpiece 11. Thereafter, the backup cylinder 5 is actuated so that the electrode 7 at the side of the fixed arm 3 is moved further toward and brought into contact with the workpiece 11 whereby the workpiece 11 is held by the fixed arm 3.

Thereafter, the electrode 10 at the side of the movable arm 9 is moved toward and brought into contact with the workpiece 11 by actuation of the main cylinder 8 and the pressure force and the current is applied to the workpiece 11 to complete the welding operation.

During the step of holding the workpiece 11, the electrode 7 stops with certainty and holds the workpiece 11 at the time when the electrode 7 at the side of the fixed arm 3 is moved toward and brought into contact with the workpiece 11. Hence, the distortion of workpiece 11 is not liable to occur when the electrode 7 is brought into contact with the workpiece 11.

Figure 2:
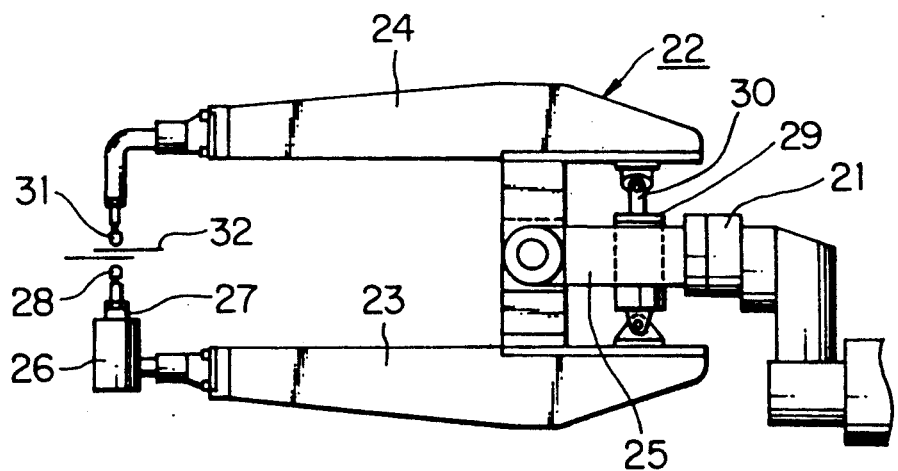
FIG. 2 is a side elevational view of an X=type welding gun provided with a backup cylinder according to a second embodiment of the present invention.

Second Embodiment (FIG. 2)

An X-type welding gun provided with a backup cylinder according to a second embodiment of the present invention will be described with reference to FIG. 2.

First and second movable arms 23, 24 respectively constituting the X-type welding gun 22 provided with a backup cylinder are pivotally mounted on a tip end of a robot arm 21 via a bracket 25. The first movable arm 23 has a backup cylinder 26 at the tip end thereof and having an electrode 28 at the tip end theeeof. The first movable arm 23 has a main cylinder 29 pivotally mounted on the rear portion thereof. The main cylinder 29 has a rod 30 pivotally mounted on the rear portion of the second movable arm 24. The second movable arm 24 has an electrode 31 connected thereto at the tip end thereof and confronting the electrode 28.

The X-type welding gun provided with a backup cylinder and having such an arrangement operates as follows:

The electrodes 28, 31 of the first and the second movable arms 23, 24 are moved toward positions adjacent to a workpiece 32 by the robot arm 21. Thereafter, the backup cylinder 26 is actuated so that the electrode 28 of the first movable arm 23 is moved toward and brought into contact with the workpiece 32 by the rod 27 of the backup cylinder 26.

Thereafter, the main cylinder 29 is actuated so that the electrode 31 of the second movable arm 24 is brought into contact with the workpiece 32 and the pressure force is applied by both the first and the second movable arms 23, 24, and the current is applied to the workpiece 32 whereby the welding operation completes.

As mentioned above, during the step of holding the workpiece 32, the electrode 28 of the first movable arm 23 stops with certainty and holds the workpiece 32 at the time when the electrode 28 of the first movable arm 23 is moved toward and brought into contact with the workpiece 32.

Figure 3:
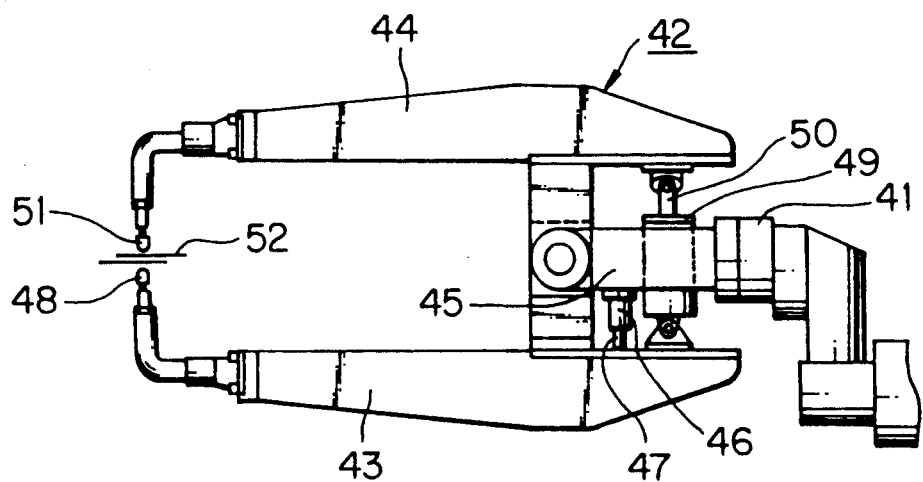
FIG. 3 is a side elevational view of an X=type welding gun provided with a backup cylinder according to a third embodiment of the present invention.
Figure 4:
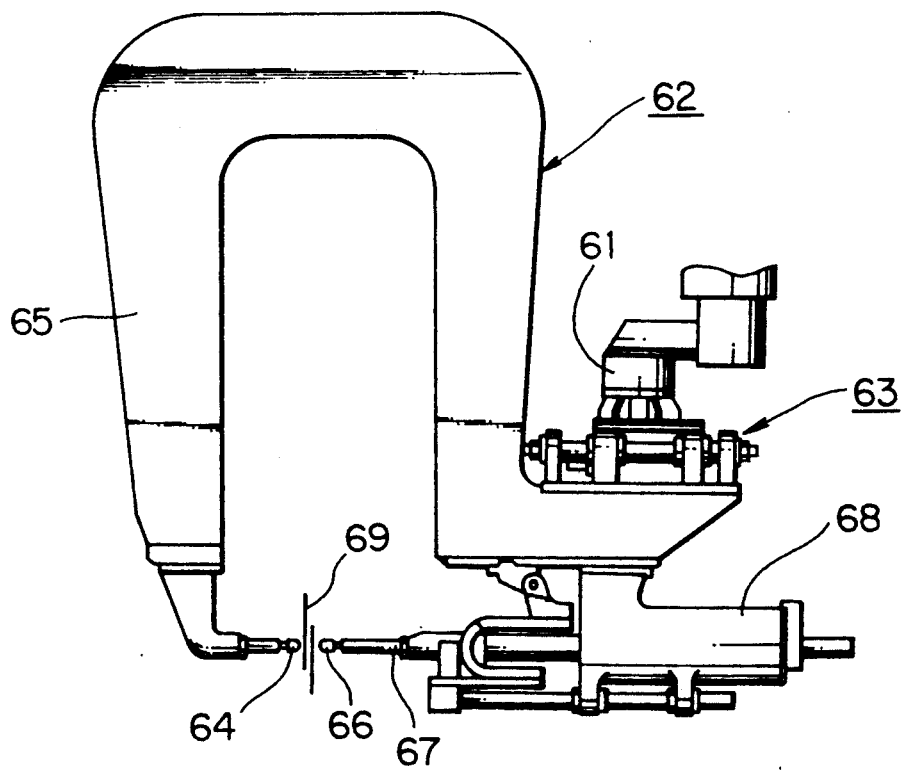
FIG. 4 is a side elevational view of a conventional welding gun.

Third Embodiment (FIG. 3)

An X-type welding gun provided with a backup cylinder according to a third embodiment of the present invention will be described with reference to FIG. 3.

First and second movable arms 43, 44 constituting the X-type welding gun 42 provided with a backup cylinder are pivotally connected with each other on a tip end of a robot arm 41 via a bracket 45. The bracket 45 has a backup cylinder 46 fixed thereto. The backup cylinder 46 has a rod 47 an end of which is brought into contact with the first movable arm 43 at the tip end thereof. The first movable arm 43 has an electrode 48 at the tip end thereof. The first movable arm 43 has a main cylinder 49 pivotally mounted thereon. The main cylinder 49 has a rod 50 having an end pivotally mounted on the second movable arm 44. The second movable arm 44 has an electrode 51 connected thereto at the tip end thereof.

The X-type welding gun provided with a backup cylinder having such an arrangement operates as follows.

The electrodes 48, 51 of the first and the second movable arms 43, 44 are moved toward the position adjacent to the workpiece 52 by the robot arm 41. Thereafter, the backup cylinder 46 is actuated so that the electrode 48 of the first movable arm 43 is moved toward and brought into contact with the workpiece 52 by the rod 47 of the backup cylinder 46.

Thereafter, the main cylinder 49 is actuated so that the electrode 51 of the second movable arm 44 is brought into contact with the workpiece 52 and the pressure force is applied to the workpiece 52 by both the first and the second movable arms 43, 44, and the current is applied to the workpiece 52 whereby the welding operation completes.

As mentioned above, during the step of holding the workpiece 52, the electrode 48 of the first movable arm 43 stops with certainty and holds the workpiece 52 at the time when the electrode 48 of the first movable arm 43 is moved toward and brought into contact with the workpiece 52, hence, there is no likelihoood of generating distorion of the workpiece 52 caused by bringing into contact with the electrode 48.

An example of the backup cylinder is disclosed in Japanese Utility Model Laid-Open Publication No. 59-34724. With the arrangement of the welding gun provided with a backup cylinder according to the present invention, there are following advantages.

Inasmuch as the electrode provided at one arm stops with certainty and holds the workpiece at the time when the same electrode is brought into contact with the workpiece, the distortion of the workpiece is not liable to occur when the same electrode is brought into contact with the workpiece. Furthermore, inasmuch as the equalizing device is not employed in the present welding gun provided with a backup cylinder, the welding gun provided with a backup cylinder is simplified and the weight thereof becomes light. Still furthermore, since the fixing position between the robot arm and the welding gun provided with a backup cylinder can be near a gravity position of the welding gun provided with a backup cylinder, the robot size can be reduced.

Although the invention has been described in its preferred form with a certain degree of particularity, it is to be understood that many variations and changes are possible in the invention without departing from the scope thereof.

What is claimed is:

1. A welding system, comprising:
   a C-type welding gun having a fixed arm and a movable arm, said arms each having an inner end and an outer end,
   a robot arm having a tip end, said robot arm being adapted for moving said welding gun to a position adjacent the work to be welded,
   a bracket fixedly securing the inner end of said fixed arm to said tip end of said robot arm,
   a backup cylinder fixed to the outer end of said fixed arm and having a movable rod having a tip end, a first welding electrode on the tip end of said movable rod,
   a main cylinder fixedly secured with respect to said fixed arm close to the inner end thereof;
   said movable arm being connected to said main cylinder so that said movable arm can be moved toward and away from said fixed arm by operation of said main cylinder, and a second welding electrode mounted on the outer end of said movable arm and disposed in opposing relation to said first welding electrode for clamping and welding the work therebetween.

2. A welding system, comprising:
   an X-type welding gun having first and second movable arms, said arms each having an inner end and outer end,
   a robot arm having a tip end, said robot arm being adapted for moving said welding gun to a position adjacent the work to be welded,
   a bracket pivotally mounting the inner ends of said arms on said tip end of said robot arm,
   a backup cylinder fixed to the outer end of said first arm and having a movable rod having a tip end, a first welding electrode on the tip end of said movable rod,
   a main cylinder pivotally mounted on said first arm close to the inner end thereof;
   said main cylinder having a rod pivotally connected to said second arm close to the inner end thereof so that said arms can be moved toward and away from each other by operation of said main cylinder, and a second welding electrode mounted on the outer end of said second arm and disposed in opposing relation to said first welding electrode for clamping and welding the work therebetween.

3. A welding system comprising:
an X-type welding gun having first and second movable arms, said movable arms each having an inner end and an outer end, said movable arms each having a welding electrode at the outer end thereof for clamping and welding the work therebetween;
a robot arm having a tip end, said robot arm being adapted for moving said welding gun to a position adjacent the work to be welded,
a bracket pivotally mounting the inner ends of said movable arms on said tip of said robot arm,
a backup cylinder fixed to said bracket and having a rod, said rod having an end which bears against said first movable arm close to said inner end thereof,
a main cylinder pivotally secured to said first movable arm, said main cylinder having a rod the end of which is pivotally connected to said second movable arm so that said first and second movable arms can be moved toward and away from each other by operation of said main cylinder.

* * * * *